Dec. 19, 1967 D. W. LEW ETAL 3,359,521

BISTABLE RESISTANCE MEMORY DEVICE

Filed Oct. 26, 1965 5 Sheets-Sheet 1

INVENTORS
DONG W. LEW
EUGENE P. FINGER

BY Cushman, Darby & Cushman
ATTORNEYS

INVENTORS
DONG W. LEW
EUGENE P. FINGER
BY
Cushman, Darby & Cushman
ATTORNEYS

BISTABLE RESISTANCE MEMORY DEVICE

Filed Oct. 26, 1965

5 Sheets-Sheet 3

INVENTORS
DONG W. LEW
EUGENE P. FINGER

BY Cushman, Darby & Cushman
ATTORNEYS

BISTABLE RESISTANCE MEMORY DEVICE

Filed Oct. 26, 1965 5 Sheets-Sheet 4

INVENTORS
DONG W. LEW
EUGENE P. FINGER
BY
Cushman, Darby & Cushman
ATTORNEYS

INVENTORS
DONG W. LEW
EUGENE P. FINGER

BY Cushman, Darby & Cushman
ATTORNEYS

United States Patent Office 3,359,521
Patented Dec. 19, 1967

3,359,521
BISTABLE RESISTANCE MEMORY DEVICE
Dong W. Lew, Briarcliff Manor, and Eugene P. Finger, Brewster, N.Y., assignors to Cognitronics Corporation, Briarcliff Manor, N.Y., a corporation of New York
Filed Oct. 26, 1965, Ser. No. 513,613
36 Claims. (Cl. 338—20)

ABSTRACT OF THE DISCLOSURE

A memory device capable of exhibiting a hysteresis effect in its voltage-current characteristics so as to be switchable between two stable resistance states comprising a pair of metal electrodes and a layer separating the electrodes. A low resistance state ratio device and a high resistance state ratio device are disclosed.

This application is a continuation-in-part application of copending application Ser. No. 489,023, filed Sept. 21, 1965, now abandoned.

This invention relates to bistable memory devices, and particularly to a bistable resistance element.

In the past, numerous types of bistable devices have been constructed and utilized in various situations. Since such devices have two different stable states, they find their greatest use in binary computation systems or the like, as well as in on-off switching arrangements. It is conventional to relate the two stable states to the binary numbers 1 and 0, and to switch the devices back and forth between these two numbers, whereby a plurality of such bistable devices may signify by their combined instant states a binary number which has several digits. This is, of course, useful in accounting systems and computers.

One of the early bistable memory elements is a magnetic toroidal core, which, when utilized with windings, may exhibit a hysteresis effect. Varying degrees of squareness of the hysteresis loop are available as is well known, and those magnetic materials which exhibit a loop that is fairly square, are the ones which usually find greatest potential in bistable devices.

Other prior art type bistable devices include ferroelectric crystals and the more recent cryogenic systems. There are also thin magnetic films and magnetic two-hole (or more) devices called a "Transfluxor." A characteristic of all of these bistable devices, besides their ability to be stable in two different magnetic or other type states, is that the instant state may be sensed nondestructively. That is, the state of the device may be read out without changing the device from its sensed state to the other state, meaning that a considerable amount of time and energy are saved by precluding the necessity of re-establishing the device in its sensed state upon that state being read out.

As above indicated, the prior type of bistable devices are of the magnetic or ferroelectric types, and this requires certain attendant elements, in a given situation, to be operative. The present invention provides a bistable resistance element, which may be connected directly to any given circuit in order to have the resistance of that circuit changed. No attendant windings, strip-lines or like driving or sensing elements are necessay to be used with the resistance element of the present invention, but, instead, conductive lead lines may be connected directly to the electrode of the element.

It is, therefore, an object of this invention to provide a bistable resistance element which is simple in nature and which may be connected directly into a circuit.

Another object of this invention is to provide a bistable resistance element selected from the group consisting of a low resistance ratio bistable resistance element comprising a pair of electrodes in combination with a synthetic resin layer having dispersed therein discrete particles of a resistance material.

A further object of the invention is to provide a high resistance ratio bistable resistance element comprising a pair of electrodes in combination with an insulating layer with at least one of said electrodes being aluminum.

Other objects of the invention will be pointed out in the following description and claims and illustrated in the accompanying drawings which disclose, by way of example, the principle of the invention and the best mode, which has been contemplated, of applying that principle.

Figure 1:
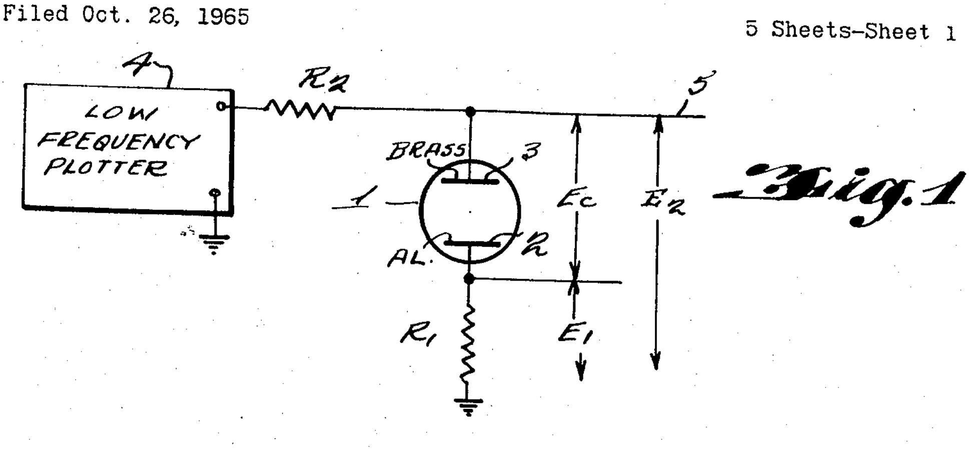
FIGURE 1 is a diagrammatic view of one type of electrical circuit which may be employed with the devices constructed in accordance with the invention.

Briefly described, the present invention provides a bistable resistance element capable of being interrogated nondestructively by small currents of either polarity selected from the group consisting of a low resistance ratio element and a high resistance ratio element. The low resistance ratio element comprises a pair of electrodes separated by a layer comprising a synthetic resin film having dispersed therein discrete particles of a resistance material selected from the group consisting of carbon, a metal and an organic dye, such as quinone dyes with closed rings. The electrodes are respectively provided from dissimilar metallic materials selected from the group consisting of aluminum, magnesium, brass, cadmium and steel. For such a device the resistance change ratio according to one embodiment of this invention is up to 20 to 1.

The high resistance ratio element comprises a pair of electrodes separated by a layer selected from the group consisting of (1) a layer of high resistivity semiconductor material, (2) a layer of an insulating material comprising discrete particles selected from the group consisting of a synthetic polyester resin and a metal, (3) a layer of a dielectric material comprising a synthetic resin film having dispersed therein a resistance material selected from the group consisting of an organic dye and an inorganic photoconductor, and (4) a layer of paper. At least one of the electrodes for the high resistance element is aluminum and the other is selected from the group consisting of aluminum, brass and silver. The resistance change ratio of such a device according to this embodiment of the invention is up to 10,000 to 1 or greater.

In general, a resin which is capable of serving as a dielectric material may be used in the practice of the present invention. Included among the various polymerized materials which may be used are: polymeric paraffins, such as polyethylene; halogenated polyethylenes, such as polyvinyl chloride polychlorotrifluorethylene and polytetrafluoroethylene; polyvinyl esters, such as polyvinyl acetate, copolymers of vinyl chloride and vinyl acetate; polyvinyl esters of polybasic acids, such as obtained from allyl alcohol and maleic anhydride; polyolefin aldehydes, such as polymerized acrolein; polyacrylic acid derivatives, such as polymerized methyl methacrylate; polystyrene; polyvinyl amines, such as polyvinyl carbazole; polymeric acid anhydride, such as obtained by heating a dibasic acid, such as adipic acid with acetic anhydride or acetyl chloride; polymeric esters, such as obtained by esterifying terephthalic acid with ethylene glycol; alkyl resins, such as obtained from glycerol and a polybasic acid, such as phthalic or maleic acid; polymerized fatty oils, such as polymerized linseed oil; epoxy resins, such as obtained by reacting a dihydroxy compound, such as bisphenol-A with an epihalohydrin, such as epichlorhydrin; synthetic rubbers, such as polybutadiene, copolymers of butadiene and styrene or acrylonitrile or vinyl toluene; polymeric 2-chlorobutadiene; polychloroprene; neoprene, polymeric sulfides, such as vulcanized ethylene polysulfide; polymeric sulfones, such as the addition product of sulfur dioxide and pentyne; polymeric imines, such as polymerized ethyleneimine; polymeric amides, such as those polymers and super polymers obtained from e-amino caproic acid, and those produced from adipic acid-tetramethylene dicarboxylic acid and hexamethylenediamine; polyurethanes, such as those obtained by reacting a bivalent isocyanate, such as toluene diisocyanate with a dihydroxy alcohol, such as ethylene glycol; formaldehyde-urea reaction products; phenol-formaldehyde condensation products; phenolfurfural condensation products, formaldehyde-aniline condensation products; polycarbonates, such as the polymeric reaction product of 2,2-(4,4'-dihydroxy diphenyl) propane and phosgene; organopolysiloxanes, such as polydimethyl siloxane; coumarone-indene resins, such as obtained from coumarone and indene; ketone resins, such as polychloroacetone; amine-aldehyde resins, such as obtained from the reaction product of benzidine with terephthaldehyde.

Preferably, for the low resistance ratio element a copolymer of vinyl toluene with butadiene and linear polyester resins are preferred while for the high resistance ratio element there are employed copolymers of butadiene with styrene and a cyanoethylated cellulose.

Preferably, also, for the low resistance ratio element the discrete particles of a resistance material consist of carbon particles; metal particles such as ferric oxide; or fluorescein, while the discrete particles for the high resistance element consist generally of a metal, such as zinc oxide, aluminum oxide, anodized aluminum; a polyester resin, such as polyethylene terephthalate (Mylar); or an organic dye, such as a quinone dye with closed rings, for instance, xanthylium salts, such as fluorescein, uranin, rhodamine 6G, an indigo dye, such as indigo carmine or synthetic indigo. These discrete particles can be used alone or as a dispersion in the above-named resinous materials.

When employing a dispersion of discrete particles in a resin to provide a layer intermediate the pair of electrodes, the discrete particles are provided in an amount of about .001 to 1% by weight and the resin is provided, generally, as a 5–40%, preferably 10–30%, by weight dispersion in an organic medium, such as toluene, ethylacetate and acetonitrile. Also, the intermediate layer, which can be applied to the electrode face in layers generally from 0.0002 to 0.0002 inch thick, has a final thickness after the application of pressure to the cell, of $10^{-5}$ inches and not greater than $5\times10^{-4}$ inches. The electrodes most often have a diameter from about 1/64 to 1/4 inch and can be provided as thin flat plates or round rods with a polished flat end. The intermediate layer can be applied to an electrode face in any conventional manner and where the layer is in the form of a dispersion in a resin, the resin can be dried at ambient temperatures or higher prior to providing a counter electrode to the coated face thereof and applying pressure to produce an effective cell. The intermediate layer can also, advantageously, be paper having a thickness ranging from about $3\times10^{-3}$ inches or greater prior to the application of pressure to the cell. Generally, commercially available paper is suitable for use and the type of paper and the thickness thereof will depend on a number of easily ascertainable factors, such as the amount of pressure applied to the cell. As an example, a cell comprising a pair of aluminum electrodes provided with a paper layer therebetween has been found to be an advantageous embodiment of the instant invention.

In the preparation of a low resistance ratio-type memory device, mixtures of the resins in Table I below were used in an organic medium, toluene and ethyl acetate, with the mixture containing 25 weight percent resin. The resistance material, graphite, fluorescein and ferric oxide powders in amounts of 10% by weight was first dispersed in the organic medium. The particle size of the resistance material ranged from colloidal particles to particles ranging from 1 micron to more than 150 microns. The resinous dispersion was then cast on flat electrode plates, the film thickness of the samples being 0.0002, 0.0005 and 0.0001 inch. The films were air dried at ambient temperature for 2 hours and then dried in a forced hot air oven at 120° F. for one-half hour.

TABLE I

| Resin | Resistance Material |
|---|---|
| Ex. I. Vinyl toluene/butadiene | Graphite. |
| Ex. II. Vinyl toluene/butadiene | Fluorescein. |
| Ex. III. Vinyl toluene/butadiene | Graphite and Fluorescein. |
| Ex. IV. Vinyl toluene/butadiene | Graphite, fluorescein and ferric oxide. |
| Ex. V. Vinyl toluene/butadiene | None. |
| Ex. VI. Vitel PE–200 | Do. |
| Ex. VII. Vitel PE–200 | Graphite. |
| Ex. VIII. Vitel PE–200 | Fluorescein. |
| Ex. IX. Vitel PE–200 | Graphite and fluorescein. |
| Ex. X. Vitel PE–200 | Graphite, fluorescein and ferric oxide. |

Vitel PE–200 is a linear polyester which is sold commercially by the Goodyear Tire and Rubber Company.

The flat electrodes with the cast films were then placed in a fixture with the counter electrode pressed onto the film. Pressure was exerted on the electrodes by a screw arrangement while cyclic sinusoidal voltage (±6 volts peak) were impressed across the cell. The pressure was slowly increased until the cell showed hysteresis or until the cell became a linear resistor, as observed on an oscilloscope.

In the preparation of a high resistance ratio-type memory device mixtures of the following resins in Table II were used in an organic medium, acetonitrile and toluene, with the indicated percentages of the resin. The insulating material, present in amounts of 1,000 p.p.m. based on the resin, was dispersed therein. The particle size of the insulating material ranged from colloidal particles to particles ranging from about 1 micron to more than 150 microns. The resinous dispersion was then cast on flat electrode plates, the film thickness of the samples being 0.0002, 0.0005, 0.001 and 0.002 inch. The films were air dried at ambient temperature for two hours and then dried in a forced hot air oven at 120° F. for one-half hour.

TABLE II

| Resin | Resistance Material |
|---|---|
| Ex. XI. Butadiene-styrene copolymer | Fluorescein. |
| Ex. XII. Butadiene-styrene copolymer | Uranine. |
| Ex. XIII. Butadiene-styrene copolymer | Rhodamine 6G. |
| Ex. XIV. Butadiene-styrene copolymer | Indigo carmine. |
| Ex. XV. Butadiene-styrene copolymer | Synthetic indigo. |
| Ex. XVI. Butadiene-styrene copolymer | Zinc oxide. |
| Ex. XVII. Cyanoethylated cellulose | Fluorescein. |
| Ex. XVIII. Cyanoethylated cellulose | Uranine. |
| Ex. XIX. Cyanoethylated cellulose | Rhodamine 6G. |
| Ex. XX. Cyanoethylated cellulose | Indigo carmine. |
| Ex. XXI. Cyanoethylated cellulose | Synthetic indigo. |
| Ex. XXII. Cyanoethylated cellulose | Zinc oxide. |

The following examples in Table III were prepared using as the intermediate layer an insulating material in the absence of a resin. Hardened and highly polished flat steel punches were employed to make diameter depressions on the electrode of various sizes, for instance, 0.0005, 0.001 and 0.002 inch deep. The powdered insulating material was pressed into the depression and the excess scraped off.

TABLE III

| Electrode System | Insulating Material |
|---|---|
| Ex. XXIII. Aluminum-brass | Polyethylene terephthalate. |
| Ex. XXIV. Aluminum-silver | Do. |
| Ex. XXV. Aluminum-aluminum | Do. |
| Ex. XXVI. Aluminum-brass | Aluminum oxide. |
| Ex. XXVII. Aluminum-silver | Do. |
| Ex. XXVIII. Aluminum-aluminum | Do. |
| Ex. XXIX. Aluminum-brass | Anodized aluminum. |
| Ex. XXX. Aluminum-silver | Do. |
| Ex. XXXI. Aluminum-aluminum | Do. |

The above cells were then placed in a fixture and pressure was applied on the electrodes by a screw arrangement. The pressure was slowly increased as 30 volts in series with 500,000 ohms were impressed continuously while observing the voltage across the cell. The cell started with very high resistance, essentially open circuit, so that the 30 volts were across the cell only. The pressure was continued until the resistance of the cell suddenly dropped to less than 1,000 ohms. The cell thus fabricated can be switched from less than 1,000 ohms to more than 1 megohm with, for instance, a 1.5 volt driver in series with 10 ohms. Driving from high to low can be accomplished with a 30 volt driver, for example, in series with a resistor having a value of 100,000 ohms or greater.

Having thus described the manner of fabricating the bistable memory devices of this invention, a low resistance ratio-resistance element consisting of an aluminum-film-brass sandwich wherein the film consisted of graphite dispersed in vinyl toluene-butadiene copolymer was employed in the following manner to illustrate its hysteretic properties.

In FIGURE 1 there is shown an elementary form of electrical circuit which illustrates the operation of the low resistance ratio bistable memory device. As shown, a memory device cell 1, constructed in the manner previously described, has its lower aluminum electrode terminal 2 connected to ground through a resistor $R_1$ having an exemplary value of 7 ohms. The other (brass) terminal 3 of the cell is connected to a low frequency plotter 4 through a resistor $R_2$ having an exemplary value of 400 ohms. The low frequency plotter 4 is also suitably connected to ground. $R_1$, which is a calibrating resistor, was inserted in series with the cell 1 to measure the cell current defined by the relationship $$I_c=\frac{E_1}{7}$$

$E_2$ was the voltage applied via line 5 and developed across the cell 1 and $R_1$. The cell voltage $E_c$ is equal to $E_2-E_1$. Theoretically, if $E_1 \ll E_2$ which is the case if $R_1 \ll R_c$, then $E_c$ is approximately equal to $E_2$. In practice, $R_1$ was never allowed to exceed approximately $0.02R_c$. All cell voltages were defined in terms of the upper brass electrode with respect to the grounded aluminum electrode. The low frequency sinusoidal $V-I$ plotter 4 has a broad voltage and current range (±70 volts, 500 ma.) in order to provide sufficient flexibility. The frequency of operation was limited to 10 cycles per minute to approximate static conditions. Very low output impedance was required since the cell voltage was chosen as the independent variable. The plotter 4, in practice, was an electromechanical device utilizing a programmable power supply and a time varying potentiometer. A timing motor-cam-gear arrangement positioned the potentiometer which, in turn, established a voltage reference for the programmable power supply. The programmable power supply had an output impedance below 0.5 ohm from DC to 100 kc. s. and a load voltage regulation within 0.1% up to 800 ma.

Figure 2:
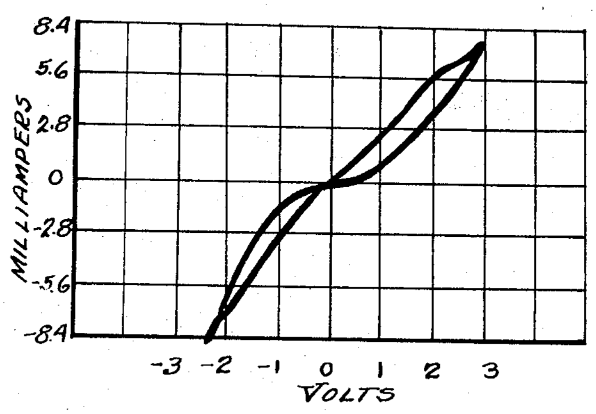
FIGURE 2 shows a hysteresis loop obtained by plotting cell current versus applied voltage for a low resistance ratio resistive element constructed according to this invention.
Figure 3:
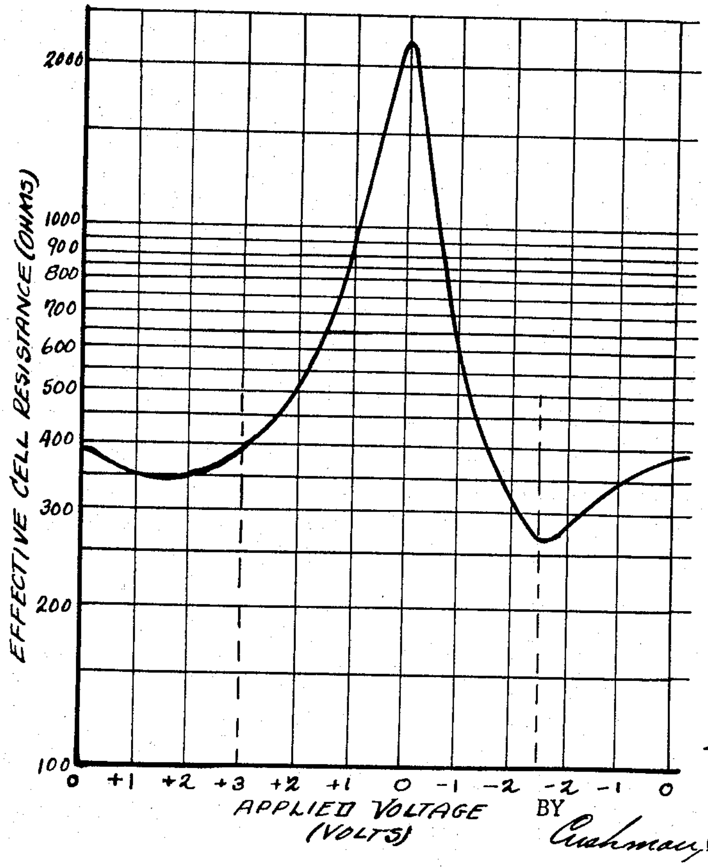
FIGURE 3 is a graph illustrating the effective cell resistance versus the applied voltage.

The results of the tests showed that a cell consisting of an aluminum-film-brass sandwich, wherein the film consisted of fluorescein dispersed in vinyl toluene-butadiene resin, possessed definite hysteretic properties as indicated in FIGURE 2. Initially, the cell exhibited an effective resistance of 390 ohms. Between +1 and +2 volts the cell approximated a linear 350 ohms resistance. At +3 volts the effective cell resistance had returned to 390 ohms. Upon descreasing the applied voltage, the hysteretic property became evident and at +2 volts the effective cell resistance had increased even further to 500 ohms. Examination about the origin revealed that the cell had obtained a maximum effective resistance of 2270 ohms while passing through the origin. The transfer characteristic of effective cell resistance versus applied voltage is shown in FIGURE 3.

Subsequently, the switching characteristics of a low resistance ratio-type memory device were examined with respect to square pulse amplitude, width, and repetition rate. As stated, a low resistance ratio element has a resistance change ratio up to 20 to 1 and can be switched with bipolar voltage pulses. The repetition rates and patterns were generated in a programmer. The pulse width was established in each direction by a separate single shot multivibrator. The pulse amplitude was held constant at ±6 volts. The output or driving stage consisted of a complementary transistor pair capable of delivering 200 ma. to the cell. Minimum pulse widths used were one microsecond with rise and fall times of 0.1 microsecond. The minimum pulse amplitude necessary for reliable operation was from 4 to 5 volts. Continuous operation was possible with pulse widths of one microsecond at repetition rates of 10 kc. s.

Now, consideration is given to a high, instead of low, resistance ratio memory device which, as stated above, shows resistance change ratios up to 10,000 to 1 or grater and can be driven by voltage pulses of either polarity. One of the high resistance ratio-type memory devices consisted of a cell having a pair of aluminum electrodes separated by a film of synthetic indigo dispersed in a butadiene-styrene copolymer. Driving the cell with a bipolar constant current generator, the $V-I$ characteristics thereof were plotted, the current being treated as an independent variable. The constant current generator was constructed to regulate the current between 1 ma. to 200 ma. while driving into a load varying from 0 to 40 ohms with a common emitter transistor configuration being employed. The output stage consisted of a NPN-PNP power transistor pair, with common collectors, driving the cell. Excess voltage considerations limited current regulation to the region below $IR=8$ volts. Because of the large resistance ratios encountered ($10^3$:1 to $10^6$:1) the high resistance and low resistance regions were treated separately.

Figure 4:
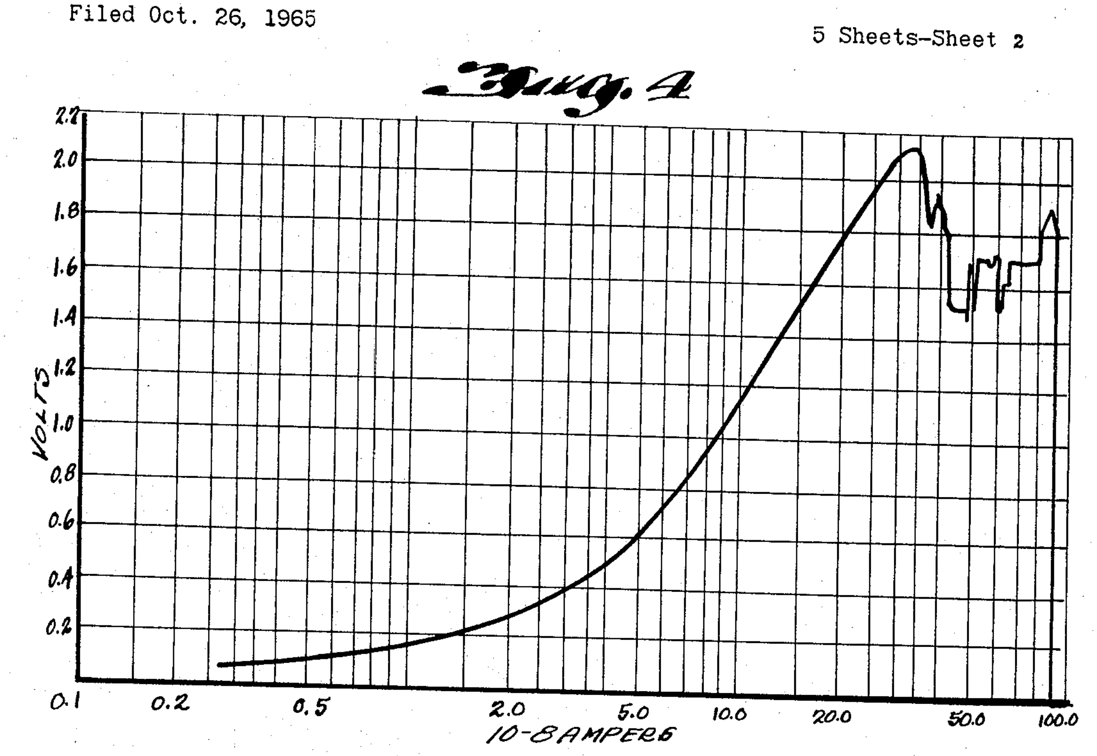
FIGURE 4 is a graph illustrating the *V–I* characteristic of high resistance ratio resistance element in the high resistance state.

FIGURE 4 shows the $V-I$ characteristics of the cell in the high resistance state. The cell resistance was approximately 15 megohms. Above 0.4 volt the resistance fell off slightly with voltage, eventually dropping to 6.5 megohms at the peak of 2.15 volts and 0.33 microampere. After the peak the cell entered an instable negative resistance region and finally switched to the low resistance state at 0.9 microampere. The curve was characteristic of other cell compositions, such as aluminum-fluorescein/butadiene-styrene-aluminum; aluminum-rhodamine 6G/butadiene-styrene-brass; aluminum-indigo carmine/(Cyanocel)-silver; aluminum-zinc oxide/butadiene styrene-aluminum, etc. The voltage peak varied generally from 0.6 volt to 2.7 volts depending on the cell chosen and the current at that peak varied from $5.5\times10^{-8}$ to $84\times10^{-8}$ amperes. The voltages at the point of switching varied from 0.6 volt to 1.8 volts and the current levels at the switching threshold varied from $11.8\times10^{-8}$ to $90\times10^{-8}$ amperes.

Figure 5:
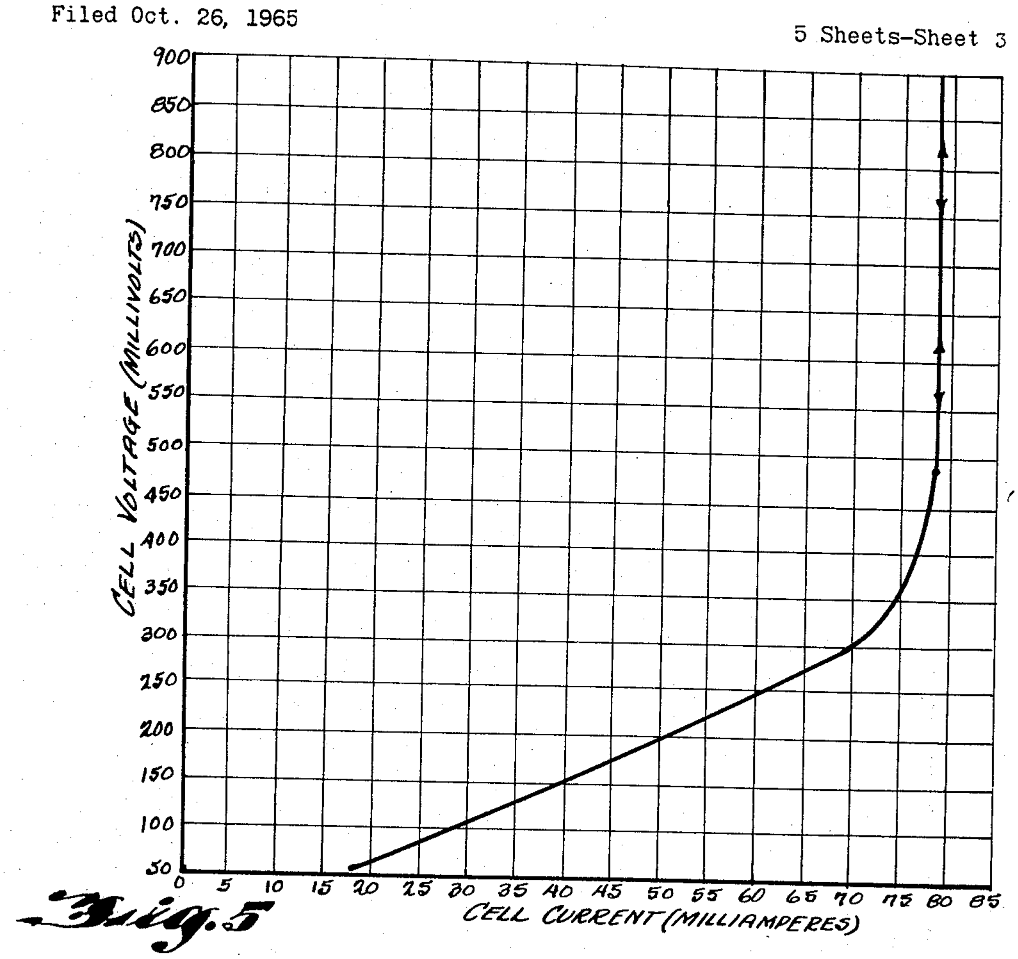
FIGURES 5 and 6 are graphs illustrating the *V–I* characteristic of a high resistance ratio resistance element in the low resistance state.

FIGURE 5 shows the *V–I* characteristics of the cell in the low resistance state. The curve was plotted up to the point where the switching action began. The cell behaved as a linear resistor up to 250 millivolts. The cell started out at about 4 ohms. At 78 milliamperes the cell started to oscillate. The lower resistance limit recorded during the oscillations was 6 ohms. The upper resistance limit was found to be between 10 and 20 ohms.

Figure 6:
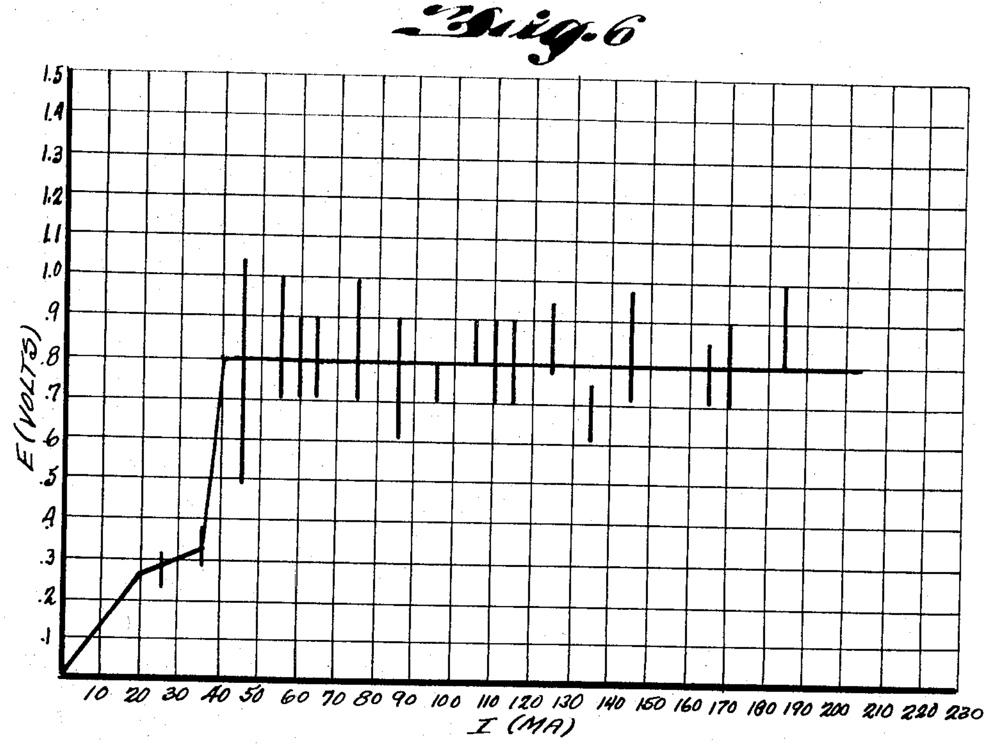

Subsequently, tests were run in which various cell compositions were driven beyond the point at which the switching action had begun, as shown in FIGURE 6. As indicated, the cell was initially a linear resistor of approximately 13 ohms. Oscillations began at 20 milliamperes, and remained essentially constant out to the end of the run at 205 milliamperes. The term oscillation is used herein to describe an unstable condition and does not imply periodicity. As can be seen, the lower limit of cell resistance decreases with increasing current and in this respect the cell was self-power limited.

The switching characteristics of the high resistance ratio-type memory device were then examined using a low voltage ramp driver for low to high switching characteristics. The low voltage range driver consisted of a transistorized ramp function generator and power amplifier. The ramp stage was adjustable from 0.2 volt per microsecond to 2 volts per second. The ramp duration was adjustable from 10 microseconds to 1 second. The output resistance of the driver was approximately 0.14 ohm. However, a series resistor was usually inserted between the driver and the cell, thus effectively raising the output resistance and providing current overload protection. The series resistor was established at 10 ohms in most instances.

Figure 7:
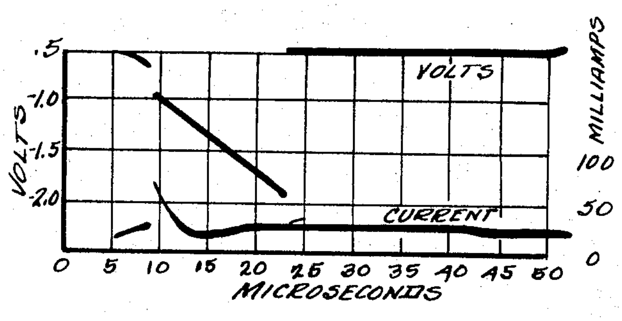
FIGURES 7–9 are graphs illustrating the low to high switching characteristic of a high resistance ratio resistance element constructed according to this invention.

FIGURE 7 shows the low to high switching characteristic of a high resistance ratio cell. The upper trace of FIGURE 7 shows the cell voltage for the full duration of the ramp. The step occurs when the cell switches to the high resistance state because of the sudden removal of the load from the driver. The lower trace shows the current flowing through the cell. The sag in the current waveform was caused by the 25 c.p.s. frequency response limit of the current probe.

Figure 8:
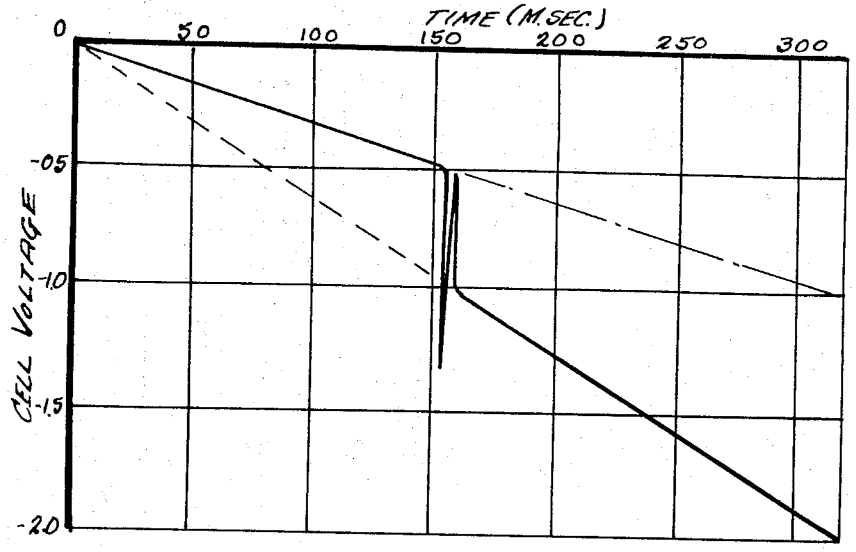

In order to emphasize the low to high switching characteristics of a high resistance ratio cell, an enlarged view of the switching waveform of such a cell is shown in FIGURE 8. The switching edge or transient switching signal of FIGURE 8 is shown in the enlarged and more accurate detailed view of FIGURE 9. The cell was nominally 10 ohms. The output impedance of the driver was also 10 ohms. In experiments, initially the cell voltage rises linearly. After 150 msec. the voltage rounds off and then starts to increase rapidly, reaching a maximum of 1.25 volts in 0.1 msec. as may be noted in FIGURE 9. It then decays and within 0.4 msec. obtains a minimum of 0.5 volt. 20 msec. later the voltage was stabilized to the open circuit driver voltage of 1 volt.

Figure 9:
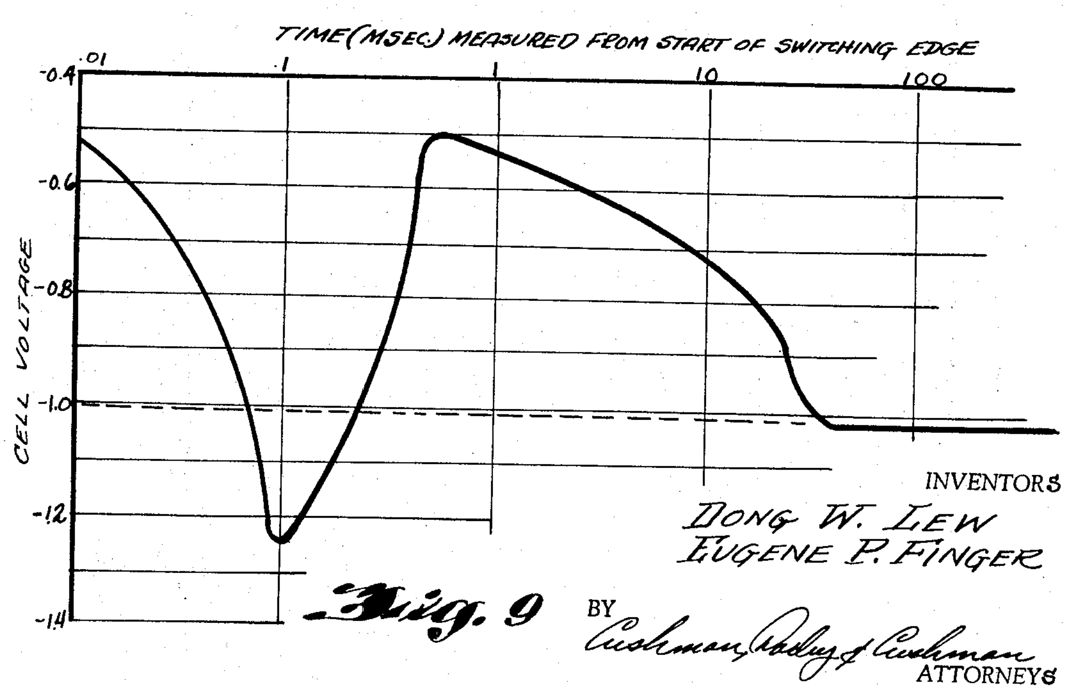

The time and relative magnitude was typical of all cells tested and invariably a wave shape similar to that shown in FIGURES 8 and 9 was attained.

Figure 10:
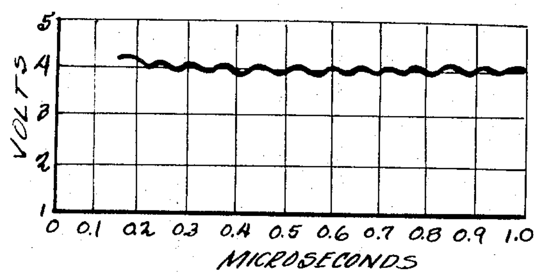
FIGURE 10 is a graph illustrating the high to low switching characteristic of a high resistance ratio resistance element constructed according to this invention.

FIGURE 10 shows the high to low switching characteristics of a high resistance ratio cell. In this test there was used a high voltage ramp driver which included a transistorized ramp function generator and output amplifier with a maximum no load terminal voltage of 40 volts. The ramp slope was adjustable from 4 volts per microsecond to 40 volts per second, while its duration was adjustable from 10 microseconds to 1 second. The output impedance of the driver was 100 kiloohms resistive shunted by 1000 mmf. The shunt capacity reduced the ramp distortion associated with high cell resistance, test fixture capacity, and a steep ramp shape. During most tests the ramp was adjusted for a maximum open circuit voltage of 30 volts and a ramp duration of 50 microseconds. Further, it was noted during the tests that the behavior of a high resistance ratio-type device when switching from high to low resistance was more reliable than in the low to high switching operation.

FIGURE 10 shows the voltage developed across the cell. The small step before the edge is a 30 nanosecond delay between the sweep and the vertical display. The edge rises in 20 to 30 nanoseconds. The oscilloscope used for the observations had a specified main vertical amplifier rise time of 30 nanoseconds and the amplifier was rated at 15 nanoseconds. Switching from high to low resistance was accomplished with sub-microsecond pulses. Generally, however, for test purposes, the ramp was made longer (typically 50 microseconds to 20 milliseconds). The switching thresholds varied from 2 to 6 volts with the majority occurring between 3 and 4 volts.

Figure 11:
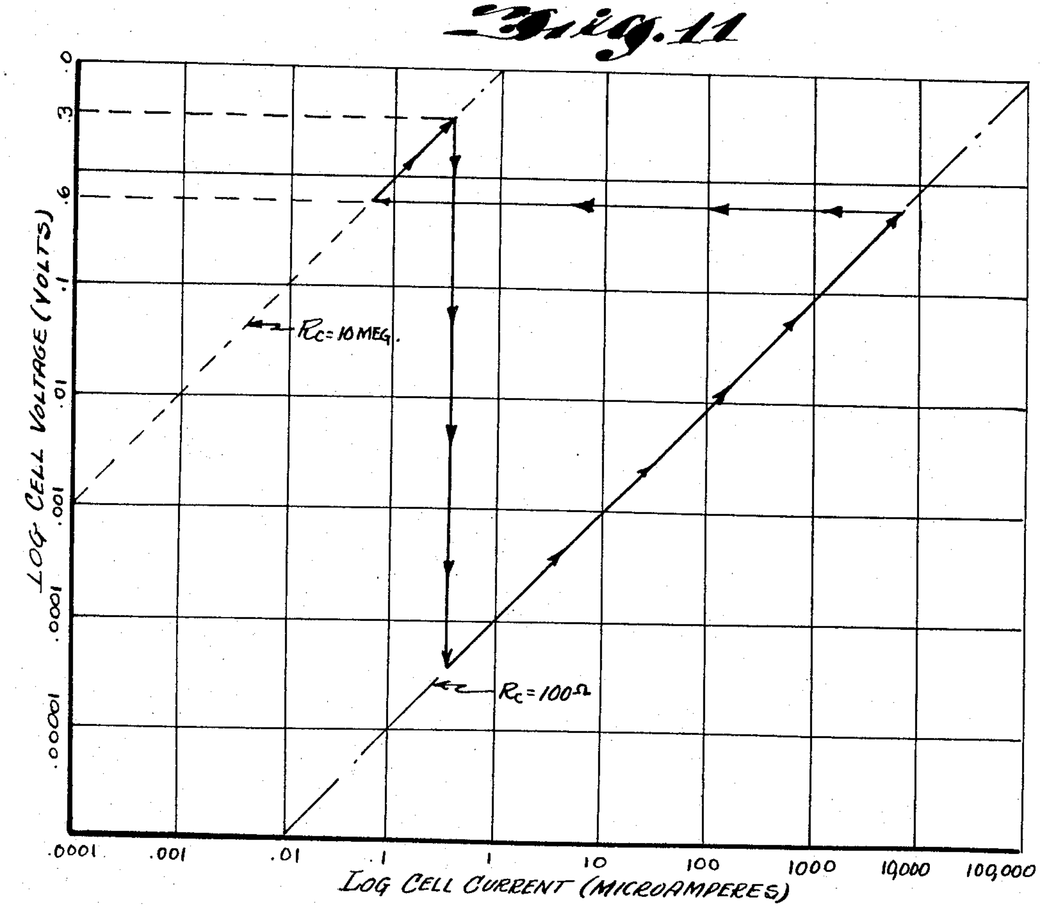
FIGURE 11 is a composite *V–I* characteristic of a high resistance ratio resistance element mode according to the invention.

A composite volt-ampere characteristic is shown in FIGURE 11. The cell is nominally switching from 100 ohms to 10 megohms. The low voltage threshold is 0.6 volt and the high voltage threshold is 3 volts. The characteristic is shown as a continuous cycle. Switching from high to low resistance required power levels ranging from 0.2 to 20 microwatts, while switching from low to high resistance required power levels ranging from 1 to 50 milliwatts.

While there have been shown and described the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A bistable resistance memory device comprising:
a cell having a pair of metal electrodes and a layer separating said electrodes,
said cell being capable of exhibiting a hysteresis effect in its voltage-current characteristics so as to be switchable between two different stable resistance states upon application of an electrical signal to said electrodes,
said cell being further capable of effectively retaining either of said states on removal of said signal,
said layer being selected from the group consisting of
 (1) a dielectric material comprising a synthetic resin film having dispersed therein discrete particles of a resistance material selected from the group consisting of carbon, a metal, and an organic dye, and
 (2) an insulating material selected from the group consisting of
  (a) discrete particles selected from the group consisting of a synthetic polyester resin and a metal,
  (b) discrete particles of a member selected from the group consisting of an organic dye and an inorganic photoconductor dispersed in a dielectric material comprising a synthetic resin, and (c) paper, with the proviso that, when aforesaid material (1) is provided, and electrodes be of different materials and be selected from the group consisting of aluminum, brass, silver, cadmium, steel and magnesium, but that when either of the aforesaid (2) materials is provided, at least one of said electrodes be aluminum and the other electrode be selected from the group consisting of aluminum, brass and silver.

2. A bistable resistance memory device comprising:

a cell having a pair of metal electrodes of different material and a layer separating said electrodes, said cell being capable of exhibiting a hysteresis effect in its voltage-current characteristic so as to be switchable between two different stable resistance states having a resistance ratio up to at least about 20 to 1, said electrodes being selected from the group consisting of aluminum, magnesium, brass, cadmium and steel, discrete particles being provided in an amount of about 0.001 to 1% by weight of a resin, and said layer having a thickness of about $10^{-5}$ to $5\times10^{-4}$ inches, said layer comprising a dielectric material consisting essentially of a synthetic resin film having dispersed therein discrete particles of a resistance material selected from the group consisting of carbon, a metal, and an organic dye.

3. A bistable resistance memory device according to claim 2 wherein the synthetic resin comprises a vinyl toluene-butadiene resin.

4. A bistable resistance memory device according to claim 2 wherein the synthetic resin comprises a linear polyester.

5. A bistable resistance memory device according to claim 2 wherein the organic dye is a quinone dye with closed rings.

6. A bistable resistance memory device according to claim 2 wherein the organic dye is an xanthylium salt.

7. A bistable resistance memory device comprising:

a cell having a pair of metal electrodes of different material selected from the group consisting of aluminum, magnesium, brass, cadmium and steel, a material layer separating said electrodes, said cell being capable of exhibiting a hysteresis effect in its voltage-current characteristic so as to be switchable between two different stable resistance states having a resistance ratio up to at least about 20 to 1.

said layer comprising a dielectric material consisting essentially of a synthetic resin film having dispersed therein discrete particles of a resistance material selected from the group consisting of carbon, ferric oxide and fluorescein and having a thickness of about $10^{-5}$ to $5\times10^{-4}$ inches.

said resin being selected from the group consisting of vinyl toluene-butadiene resin and a linear polyester in a 5–40 weight percent dispersion, and, said discrete particles being provided in an amount of about 0.01 to 1% by weight of said resin.

8. A bistable resistance memory device comprising:

a cell having a pair of metal electrodes and a material layer separating said electrodes, said cell being capable of exhibiting a hysteresis effect in its voltage-current characteristic so as to be switchable between two different stable resistance states having a resistance ratio up to at least about 10,000 to 1, one of said electrodes being aluminum and the other of said electrodes being selected from the group consisting of aluminum, brass and silver, and said material layer being selected from the group consisting of:

(1) an insulating material comprising discrete particles selected from the group consisting of a synthetic polyester resin and a metal, (2) a layer of a dielectric material comprising a synthetic resin film having dispersed therein a resistance material selected from the group consisting of an organic dye and an inorganic photoconductor, and (3) paper.

9. A bistable resistance memory device according to claim 8 wherein the polyester resin insulating material is polyethylene terephthalate.

10. A bistable resistance memory device according to claim 8 wherein the metal insulating material is selected from the group consisting of aluminum oxide and anodized aluminum.

11. A bistable resistance memory device according to claim 8 wherein the synthetic resin dielectric material is selected from the group consisting of butadiene-styrene copolymer and cyanoethylated cellulose.

12. A bistable resistance memory device according to claim 8 wherein the organic dye is a quinone dye with closed rings.

13. A bistable resistance memory device according to claim 12 wherein the organic dye is an xanthylium salt.

14. A bistable resistance memory device according to claim 8 wherein the organic dye is an indigo dye.

15. A bistable resistance memory device according to claim 8 wherein the inorganic photoconductor is zinc oxide.

16. A bistable resistance memory device according to claim 8 wherein both electrodes are aluminum and the material layer is paper.

17. A bistable resistance memory device according to claim 8 wherein the resistance material is provided in an amount of about 0.01 to 1% by weight of the synthetic resin material.

18. A bistable resistance memory device comprising:

a cell having a pair of metal electrodes one of which is aluminum, the other being selected from the group consisting of aluminum, brass and silver, and a layer separating said electrodes, said cell being capable of exhibiting a hysteresis effect in its voltage-current characteristic so as to be switchable between two different stable states, having a resistance ratio up to at least 10,000 to 1, said layer having a thickness ranging from $10^{-5}$ to $5\times10^{-4}$ inches and being selected from the group consisting of a (1) an insulating material comprising discrete particles selected from the group consisting of polyethylene terephthalate, aluminum oxide and anodized aluminum, (2) a dielectric material comprising a synthetic resin selected from the group consisting of a butadiene-styrene copolymer and cyanoethylated cellulose having dispersed therein a resistance material selected from the group consisting of fluorescein, uranine, rhodamine, indigo carmine, synthetic indigo, and zinc oxide, said synthetic resin being provided in a 5–40 weight percent dispersion and said discrete particles being provided in an amount of about 0.001 to 1% by weight of said resin, and (3) paper.

19. A new use for a resistor which includes a pair of metal electrodes and a layer of paper separating said electrodes, said new use being the method of switching said resistor between two stable resistance states, comprising the steps of:

applying a first electric signal to said electrode to cause said switching from the first of said two stable resistance states to the second of said two stable resistance states, and applying a second electric signal to said electrodes to cause said switching from the second of said two stable resistance states to the first of said two stable resistance states.

20. A new use as in claim 19 wherein said electrodes are selected from the group consisting of aluminum, brass, and silver.

21. A new use as in claim 19 wherein at least one of said electrodes is aluminum.

22. A new use for a resistor which includes a pair of metal electrodes and a layer of synthetic resin film having dispersed therein discrete particles, said layer separating said electrodes, said new use being the method of switching said resistor between two stable resistance states, comprising the steps of:

applying a first electric signal to said electrode to cause said switching from the first of said two stable resistance states to the second of said two stable resistance states, and applying a second electric signal to said electrodes to cause said switching from the second of said two stable resistance states to the first of said two stable resistance states.

23. A new use as in claim 22 wherein said discrete particles are selected from the group consisting of carbon, a metal, and an organic dye.

24. A new use as in claim 22 wherein said electrodes are selected from the group consisting of aluminum, brass, silver, cadmium, steel and magnesium.

25. A new use as in claim 22 wherein said electrodes are of different materials.

26. A new use for a resistor which includes a pair of metal electrodes and a layer of insulating material composed of discrete particles said new use being the method of switching said resistor between two stable resistance states, comprising the steps of:

applying a first electric signal to said electrode to cause said switching from the first of said two stable resistance states to the second of said two stable resistance states, and applying a second electric signal to said electrodes to cause said switching from the second of said two stable resistance states to the first of said two stable resistance states.

27. A new use as in claim 26 wherein said discrete particles are selected from the group consisting of a synthetic polyester resin and a metal.

28. A new use as in claim 26 wherein said discrete particles are selected from the group consisting of an organic dye and an inorganic photoconductor dispersed in a dielectric material comprising a synthetic resin.

29. A new use as in claim 25 wherein said electrodes are selected from the group consisting of aluminum, brass and silver.

30. A new use as in claim 25 wherein at least one of said electrodes is aluminum.

31. A method of constructing a bistable resistance ratio memory device capable of exhibiting a hysteresis effect in voltage-current characteristics so as to be switchable between two different stable resistance states upon application of an electric signal, comprising the steps of:

dispersing discrete particles of a resistance material in a layer of synthetic resin, casting said layer with said dispersed particles therein on a first metal electrode to form a thin film, placing said film on said first electrode in a fixture with a second metal electrode in contact with said film opposite said first electrode, and applying sinusoidal voltages between said first and second electrodes while exerting increasing pressure between said first and second electrodes until said memory device exhibits hysteresis in its voltage-current characteristics.

32. The method of 31 wherein said resistance material is selected from the group consisting of carbon, a metal and an organic dye.

33. The method of 31 wherein said first and second electrodes are selected from the group consisting of aluminum, silver, magnesium, brass, cadmium and steel.

34. The method of 31 including the step of drying said first electrode with said layer with said dispersed particles therein.

35. A method of constructing a bistable resistance ratio memory device capable of exhibiting a hysteresis effect in its voltage-current characteristics so as to be switchable between two different stable resistance states upon application of an electric field, comprising the steps of:

punching a depression on a first metal electrode, pressing a powdered insulating material into said depression, placing said first electrode containing said insulating material in a fixture with a second metal electrode in contact with said insulating material, and applying sinusoidal voltages between said electrodes while exerting increasing pressure between said electrodes until said memory device exhibits hysteresis in its voltage-current characteristics.

36. A method as in claim 35 wherein said powdered insulating material is selected from the group consisting of a synthetic polyester resin, a metal, an organic dye, and an inorganic photoconductor dispersed in a dielectric material comprising a synthetic resin.

References Cited

UNITED STATES PATENTS

| | | | |
|---|---|---|---|
| 2,472,214 | 6/1949 | Huruitz | 338—114 |
| 2,930,999 | 3/1960 | Van Santen et al. | 338—15 |
| 2,978,665 | 4/1961 | Vernet et al. | 338—223 |
| 3,058,079 | 10/1962 | Jones | 338—35 |
| 3,210,831 | 10/1965 | Johnson et al. | 338—223 |
| 3,243,753 | 3/1966 | Kohler | 338—28 |
| 3,245,019 | 4/1966 | Heywang et al. | 338—20 |
| 3,247,477 | 4/1966 | Fridrich | 338—15 |
| 3,295,088 | 12/1966 | Smith | 338—14 |

FOREIGN PATENTS

| | | |
|---|---|---|
| 946,891 | 1/1964 | Great Britain. |

RICHARD M. WOOD, *Primary Examiner.*

W. BROOKS, *Assistant Examiner.*